United States Patent
Gateman et al.

(10) Patent No.: US 9,417,359 B2
(45) Date of Patent: Aug. 16, 2016

(54) OCEAN BOTTOM SEISMIC NODE SYSTEM

(71) Applicant: MAGSEIS AS, Lysaker (NO)

(72) Inventors: Jan B. Gateman, Bekkestua (NO); Nils P. Gateman, Märsta (SE)

(73) Assignee: MAGSEIS AS, Lysaker (NO)

( * ) Notice: Subject to any disclaimer, the term of this patent is extended or adjusted under 35 U.S.C. 154(b) by 0 days.

(21) Appl. No.: 14/420,509

(22) PCT Filed: Jul. 30, 2013

(86) PCT No.: PCT/NO2013/000041
§ 371 (c)(1),
(2) Date: Feb. 9, 2015

(87) PCT Pub. No.: WO2014/027892
PCT Pub. Date: Feb. 20, 2014

(65) Prior Publication Data
US 2015/0219790 A1    Aug. 6, 2015

Related U.S. Application Data

(60) Provisional application No. 61/683,721, filed on Aug. 16, 2012.

(30) Foreign Application Priority Data

Aug. 16, 2012   (NO) .................................. 20120915

(51) Int. Cl.
*G01V 1/00* (2006.01)
*G01V 13/00* (2006.01)
(Continued)

(52) U.S. Cl.
CPC  *G01V 13/00* (2013.01); *G01V 1/16* (2013.01);
*G01V 1/18* (2013.01); *G01V 1/3808* (2013.01);
*G01V 2200/12* (2013.01)

(58) Field of Classification Search
CPC ........... G01V 1/18; G01V 1/16; G01V 13/00; G01V 2200/12
See application file for complete search history.

(56) References Cited

U.S. PATENT DOCUMENTS 4,281,403 A    7/1981  Siems
7,016,260 B2 *  3/2006  Bary .................... G01V 1/3852
                                                      181/110

(Continued)

FOREIGN PATENT DOCUMENTS

WO    2004001455    12/2003
WO    2006069067    6/2006

OTHER PUBLICATIONS

Norwegian Search Report, issued in patent application No. 20120915, Sep. 13, 2014, pp. 1-2.

(Continued)

*Primary Examiner* — Luke Ratcliffe
*Assistant Examiner* — Hovhannes Baghdasaryan
(74) *Attorney, Agent, or Firm* — Jeffrey S. Melcher; Manelli Selter PLLC

(57) ABSTRACT

The invention relates to a seismic node (100), comprising at least one seismic sensor with associated electronics, a primary oscillator (106) for timing sensor signals, a reference oscillator (104), a memory, a power source, a switch (102) for turning the reference oscillator on and off, and a processor (112) for digitizing sensor signals and storing them in the memory, calibrating a frequency of the primary oscillator (106) based on the frequency of the reference oscillator (104), and turning the reference oscillator on and off.

21 Claims, 9 Drawing Sheets

(51) Int. Cl.
  *G01V 1/16*  (2006.01)
  *G01V 1/18*  (2006.01)
  *G01V 1/38*  (2006.01)

(56) References Cited

U.S. PATENT DOCUMENTS

| | | |
|---|---|---|
| 7,254,093 B2 | 8/2007 | Ray |
| 7,551,911 B2* | 6/2009 | Shohara et al. ... H04W 52/0216 455/255 |
| 7,558,157 B1 | 7/2009 | Gardner |
| 8,050,140 B2 | 11/2011 | Ray |
| 2005/0177310 A1 | 8/2005 | Duncan |
| 2005/0246137 A1 | 11/2005 | Brinkman |
| 2005/0285645 A1 | 12/2005 | Hall |
| 2006/0144170 A1* | 7/2006 | Stephen et al. .......... G01V 3/12 73/865.9 |
| 2006/0187866 A1 | 8/2006 | Werb |
| 2008/0049550 A1 | 2/2008 | Fleure |
| 2009/0080290 A1 | 3/2009 | Ray |
| 2010/0017139 A1* | 1/2010 | Adams et al. .......... G01V 1/003 702/14 |
| 2010/0034053 A1 | 2/2010 | Fleure |
| 2011/0158047 A1* | 6/2011 | Beffa et al. ............ G01V 1/223 367/40 |
| 2011/0309948 A1* | 12/2011 | Montgomery et al. G01V 13/00 340/853.1 |
| 2012/0275274 A1* | 11/2012 | Gochnour et al. ..... H04B 11/00 367/134 |

OTHER PUBLICATIONS

International Preliminary Report on Patentability, issued in PCT/NO2013/000041, Oct. 30, 2013, pp. 1-5.
Carleton University, systems and Computer Engineering, Technical Report SCE-08-12, Nov. 2008: "Frequency Accuracy & Stability Dependencies of Crystal Oscillators" by: Hui Zhou, Charles Nicholls, Thomas Kunz, Howard Schwartz Cardinal Components Inc. Applications Brief No. A.N. 1006: "Clock Oscillator Stability".

* cited by examiner

|  | Quartz Oscillators | | | Atomic Oscillators | | |
|---|---|---|---|---|---|---|
|  | TCXO | MCXO | OCXO | Rubidium | RbXO | Cesium |
| Accuracy (per year) | $2 \times 10^{-6}$ | $5 \times 10^{-8}$ | $1 \times 10^{-8}$ | $5 \times 10^{-10}$ | $7 \times 10^{-10}$ | $2 \times 10^{-11}$ |
| Aging/Year | $5 \times 10^{-7}$ | $2 \times 10^{-8}$ | $5 \times 10^{-9}$ | $2 \times 10^{-10}$ | $2 \times 10^{-10}$ | 0 |
| Temp. Stab. (range, °C) | $5 \times 10^{-7}$ (−55 to +85) | $3 \times 10^{-8}$ (−55 to +85) | $1 \times 10^{-9}$ (−55 to +85) | $3 \times 10^{-10}$ (−55 to +68) | $5 \times 10^{-10}$ (−55 to +85) | $2 \times 10^{-11}$ (−28 to +65) |
| Stability, $\sigma_y(\tau)$ ($\tau=1s$) | $1 \times 10^{-9}$ | $3 \times 10^{-10}$ | $1 \times 10^{-12}$ | $3 \times 10^{-12}$ | $5 \times 10^{-12}$ | $5 \times 10^{-11}$ |
| Size ($cm^3$) | 10 | 30 | 20-200 | 200-800 | 1,000 | 6,000 |
| Warmup Time (min) | 0.03 (to $1 \times 10^{-6}$) | 0.03 (to $2 \times 10^{-8}$) | 4 (to $1 \times 10^{-8}$) | 3 (to $5 \times 10^{-10}$) | 3 (to $5 \times 10^{-10}$) | 20 (to $2 \times 10^{-11}$) |
| Power (W) (at lowest temp.) | 0.04 | 0.04 | 0.6 | 20 | 0.65 | 30 |
| Price (~$) | 10 - 100 | <1,000 | 200-2,000 | 2,000-8,000 | <10,000 | 50,000 |

FIG. 10

OCEAN BOTTOM SEISMIC NODE SYSTEM

INTRODUCTION

The present invention relates to the field of marine seismic exploration. More particularly, the invention relates to marine seismic data acquisition using seismic nodes, and a method for saving power without compromising accuracy in preset survey specification.

BACKGROUND

Marine seismic exploration methods uses a seismic source which transmits a seismic signal, while a receiving device measures the amplitudes and arrival times of the seismic signals returned (reflected/refracted) by discontinuities in the sub surface. The discontinuities are formed by interfaces between layers having different elastic properties and are called seismic reflectors. The returned seismic signals are recorded by seismic sensors at the ocean bottom or near the sea level.

In marine seismic exploration two main techniques are used to record the returned seismic signals. One is by using hydrophone cables that are towed behind a vessel. This technique only records the pressure waves (P-waves) since the shear waves (S-waves) do not propagate through the water column. The other technique is to deploy seismic nodes that contain both hydrophones and geophones at the ocean bottom. By doing so both P-waves and S-waves can be recorded and hence more useful data will be recorded and subsequently processed and used for mapping the sub surface.

During recent years, there has been an increased effort to improve the results of marine seismic investigations by collecting seismic signals at the ocean bottom instead of using the more usual vessel towed hydrophones for signal recording.

We will in the following describe the existing, known methods for acquisition of marine seismic data using seismic sensors located on the ocean bottom. There are basically two principal methods that are used at present for collecting seismic data using seismic sensors.

The first method is to deploy an ocean bottom cable with integrated seismic sensors and electrical and/or optical wiring from the seismic sensors to the sea level where the seismic data is recorded. The seismic signals are generated by a seismic source deployed and towed by a source vessel. During data recording the cable is normally attached to a recording vessel or the cable deploying vessel. In the last couple of years a slightly different approach has been in use whereby the separate cable deploying vessel has been replaced with a recording buoy that also provides the cable with electrical power generated from either a diesel generator or from batteries located in the buoy. All or part of the recorded data is then transmitted via a radio link from the buoy to either the source vessel or the cable deploying vessel.

The second present method that is used is to deploy and recover autonomous seismic data recording nodes to and from the ocean bottom by using a remotely operated vehicle or by simply dropping the seismic nodes in the sea and then let them slowly descend to the ocean bottom. In the latter case the seismic nodes are recovered by a vessel by transmitting a signal that triggers a mechanism in each of the seismic nodes that activates its floating device or releases the seismic node from an anchorage weight such that the seismic node can slowly float up to the sea level by itself. Another way of using these nodes, which has been applied, is to attach the autonomous seismic nodes to a flexible rope, drop the seismic nodes with slack in the rope and then let them descend to the ocean bottom. After the recording is completed the nodes are recovered by winching up the rope.

With the present method, a vessel needs to deploy the seismic nodes, and after the seismic data is recorded retrieve the nodes for further usage. In changing marine environments and due to different weather conditions this cannot always be optimally scheduled. During a typical data acquisition programme, the seismic nodes are placed underwater for a long duration, which could be several days, weeks or months at a time. Throughout the placement, oscillators in the seismic nodes may drift and thereby produce a time error in the sampled seismic data that varies due to for example temperature changes or gravitational forces.

Furthermore, the autonomous seismic nodes will have to operate for these long periods of time without any additional battery charging. The seismic nodes are thus required to be very power efficient.

During offshore oil or gas exploration, the recording precision of the seismic nodes and the parts therein are of vital importance. Due to precision errors in the seismic nodes or any parts thereof, much of the available hydrocarbon and gas may not be mapped with sufficient quality.

One of the major factors affecting recording precision is drift. Drift is the rate at which an oscillator of the seismic node gains or loose frequency in relation to a specified frequency. All oscillators will experience frequency changes though at different rates. Drift in an oscillator causes changes in the frequency of the oscillator of the seismic node, which will results in timing errors. The frequency accuracy of an oscillator is the offset from the specified target frequency. The frequency stability of the oscillator is the spread of the measured oscillator frequency relative its operational frequency during a period of time.

One significant factor affecting the drift and then the recording precision is the temperature coefficient, which may affect how much an oscillator's frequency drift in response to changes in temperature. An oscillator of the seismic node produces a signal at one frequency while on the warmer deck of a source vessel, but may produce a signal at a different frequency when submerged in cold water. The frequency drift of an oscillator will negatively impact recording precision.

In addition to drift caused by temperature, the oscillators may be affected by other environmental variations caused by vibrations, gravity, power supply variations and/or other factors. Crystal aging is another factor that has an impact on the output frequency. Aging in crystal oscillators is caused by a variety of electromechanical mechanisms. Long term stability is usually expressed in parts per million (ppm). A ppm of 15 means that over a 1 ms interval the oscillator period can change by 15 ns. Short term stability is a function of noise signals within the oscillator and represents a phase modulation of the oscillator output. Short term stability can be specified in the time domain as jitter, but depends upon the measurement interval.

A comparison among different type of oscillators is shown in FIG. 10.

Oscillators may also need some time from startup before they reach the necessary stability in their output frequency. According to different accuracy, stability and cost requirements, different types of oscillators are developed. Compensation of the temperature dependence has resulted in oscillators based on different temperature control methods; Temperature Compensation Crystal Oscillators "TCXO", which uses a temperature compensation circuit; Oven Controlled Crystal Oscillator "OCXO", which uses an oven to control the crystal temperature.

It is costly and time consuming to place seismic nodes at the ocean bottom, and the weather may restrict time available for data acquisition and this may result in inadequate power to run all the electronics including the oscillators. In addition, many types of oscillators will drift because of temperature variations etc., while others may use so much power that it will limit the number of days the electronics will function. The physical size of existing oscillators and battery power packs required may also be a limitation. If an ocean bottom cable with electric conductors is used, then a power supply onboard the vessel is required, but water might enter electrical terminations and connectors and thus affect the usability of the cable. Also, the cable cannot be too long as this would cause the transmitted voltage to drop to an unacceptable level (the cable may be several kilometers long).

U.S. Pat. No. 4,281,403 discloses a decentralized seismic data recording system wherein individual recording units located remotely from a central station are used for recording of seismic data. The units include a self-contained time counter and means for programming a plurality of recording cycles at desired intervals in synchronization with seismic shots initiated by the central station. A local time counter in each remote unit is compared to the present value in a master clock time counter in the central station. The local accumulated time count as read from the respective remote-unit time counters and the accumulated time count of the master clock are separately recorded on special data files on the archival storage medium in each of the corresponding remote units. The difference in accumulated time between the local clock and the master clock may then be linearly prorated among all of the recorded data files for each of the remote units, thus synchronizing them with the master clock and with each other.

US 2005/0246137 illustrates a method and system for acquiring seismic data without the need for wire line telemetry or radio-telemetry components or radio initiation. A plurality of individual wireless seismic data acquisition units are used wherein the individual data acquisition units may function as data sensor recorders and/or as source-event recorders. Each data acquisition unit records an independent stream of seismic data over time, such as in the form of displacement versus time. The data acquisition units do not require radio contact with other data acquisition units, nor do they require direct synchronization with other receiver units or with a source start time.

US 2009/0080290 discloses a nodal seismic data acquisition system that utilizes an external, common distributed time base for synchronization of the system operation. The system implements a method to correct the local time clock based on intermittent access to the common remote time reference. The method corrects the local time clock via a voltage controlled oscillator to account for environmentally induced timing errors. The invention further provides for a more stable method of correcting drift in the local time clock.

US 2010/0034053 discloses a method for acquiring seismic data by recording seismic data with a plurality of autonomous seismic data acquisition units wherein each acquisition unit comprises a digitally controlled temperature-compensated crystal oscillator. Oscillator-based timing signals are acquired that are associated with the plurality of digitally controlled temperature compensated crystal oscillators and a time correction is determined using the oscillator-based timing signals from the first and second autonomous seismic data acquisition unit.

U.S. Pat. No. 7,254,093 discloses a seismic data collection unit or pod comprising a water tight case. The case houses other components that may include a clock, a power source, a control mechanism and a seismic data recorder. More specifically, Seafloor Seismic Recorders "SSR" units of the Ocean Bottom Seismic "OBS" type generally include one or more geophone and/or hydrophone sensors, a power source, a seismic data recorder, a crystal oscillator clock, a control circuit, and, in instances when gimbaled geophones are used and shear data are recorded, compasses or gimbals.

U.S. Pat. No. 7,558,157 illustrates that in order to reliably and accurately accomplish error-free data from a suite of independent sensors/nodes or an array of sensors, each node includes an atomic clock. In addition, the central data receiver/processor also includes an atomic clock. Each node transmits a time-stamped pseudo-random code. The processor compares the time-stamped pseudo-random code transmitted from nodes with its own internal time-stamped pseudo-random code. By embedding an atomic clock within the processor, data correction and/or calibration is improved in comparison with a conventional GPS receiver not having an internal atomic clock.

U.S. Pat. No. 8,050,140 discloses self-contained ocean bottom pods characterized by low profile casings. A pod may include an inertial navigation system to determine ocean bottom location and a rubidium clock for timing. A clock that is affected by gravitational and temperature effects can cause a frequency shift in the oscillator frequency, thereby resulting in errors in the seismic data. The use of a rubidium clock, which is less susceptible to temperature or gravitational effects or orientation of the unit on the ocean bottom, will result in accurate seismic data recording. The clocks are synchronized with the firing time of the seismic energy source.

Carleton University, systems and Computer Engineering, Technical Report SCE-08-12, Nov. 2008: "Frequency Accuracy & Stability Dependencies of Crystal Oscillators" by: Hui Zhou, Charles Nicholls, Thomas Kunz, Howard Schwartz Cardinal Components Inc. Applications Brief No. A.N. 1006: "Clock Oscillator Stability"

Further, with better and more reliable seismic nodes and the grids or arrays made out of them, the seismic nodes can remain underwater for a longer duration with less maintenance. This will provide more flexibility to operations and also reduce expenses.

The need for lower battery power consumption along with proper dealing with frequency drift remains a major challenge for most seismic node system operations. These issues limit the application of seismic nodes to areas where cable surveys are not an option for operational reasons, for example in the vicinity of platforms or in deep water.

The seismic nodes have been proven to be difficult to operate due to the operational difficulties mentioned above.

The methods of data acquisition described above may not be viable solutions for long duration surveys. The efficiency of these systems is too low and may at times provide inaccurate data.

SUMMARY

The present invention has been conceived to remedy or at least alleviate the above stated problems of the prior art.

In a first aspect, the invention provides a seismic node device comprising an primary oscillator and a reference oscillator, a processor for controlling the frequency calibration of the primary oscillator using a frequency calibration value based on a frequency provided by the reference oscillator, and wherein the processor repeatedly calculates the frequency calibration value.

The reference oscillator "RF" can be an atomic clock or an oven controlled crystal oscillator (OCXO). In the invention the RF may generate the same output frequency as the primary oscillator that might be a temperature compensated crystal oscillator "TCXO", or any oscillator with a sufficient quality. The output frequency can be used in connection with an analog to digital converter. In general, an atomic clock or an OCXO consumes more power than a TCXO but is generally more stable even when affected by ambient temperature changes and/or gravitational effects. An RF may be used in the present invention which uses only about 100 mW or less. The TCXO, used as primary oscillator in the present invention, may only use about 8-12 mW or less, but it will provide an inaccurate frequency leading to inaccurate sampling of the seismic data. In general, the more accurate an oscillator is, the more power it will use. In the present invention, an RF unit can be chosen to work with a TCXO unit in a seismic node to provide high precision data recordings from the ocean bottom with optimal power efficiency at an average power consumption of 20-50 mW or less.

In a second aspect, the invention provides a method for calibrating a frequency of a primary oscillator, wherein said method comprises calculating a frequency calibration value for the frequency of the oscillator based on a frequency of a reference oscillator, and wherein the frequency calibration value is repeatedly calculated at predetermined time intervals.

In a third aspect the invention provides a drift calibration method for a primary oscillator. The method comprises calculating a frequency calibration value for the frequency of the primary oscillator based on a frequency of a reference oscillator, calibrating the frequency of the primary oscillator using the frequency calibration value, wherein the frequency calibration value is repeatedly calculated at predetermined time intervals, and wherein start and stop signals are sent to the reference oscillator in longer or shorter cycles of predetermined time intervals depending upon the requirement of overall system time accuracy.

In an embodiment of the invention, a seismic data acquisition system comprises a plurality of autonomous seismic nodes, at least one of the autonomous seismic nodes comprising a primary oscillator and a reference oscillator generating a reference frequency, a temperature sensor for detecting ambient temperature, an inertial sensor for detecting movements of an oscillator, a memory storing digital recorded seismic data, generated from hydrophone(s) and/or geophone(s), and a power source supplying electrical power to the system, wherein a processor calculates a calibration factor based on input from the temperature sensor, the inertial sensor, and the reference frequency, and wherein the processor repeatedly calculates and calibrates the primary oscillator using the calibration factor at predetermined time intervals, providing high precision data readings from the ocean bottom with optimal power efficiency.

In another embodiment of the invention, a computer device includes a recording device and a calibration module. The calibration module has instructions that are executed by the computer device. The instructions include the following logic: receiving environmental data from the environmental sensors and decide upon a predetermined program, comparing a frequency of a primary oscillator and a frequency of a reference oscillator, calculating a calibration factor based on the comparison of the received data, wherein the computing device is configured to repeatedly calibrate the frequency of the primary oscillator using the calibration factor at predetermined time intervals, and this is used to achieve high precision data readings with optimal power efficiency.

In one aspect of the invention, a reference oscillator is operating continuously during deployment of the seismic nodes and during retrieval. The reference oscillator is stopped first after the node at the ocean bottom has become stationary and the temperature sensor indicates that the ambient and/or the internal temperature have stabilized. The reference oscillator will be calibrated and synchronized against an onboard vessel master clock before being deployed, and will be calibrated, if necessary, against said vessel master clock after the seismic nodes have been recovered onboard. The reference oscillator can be an atomic or any other high quality oscillator.

In an embodiment of the invention, a primary oscillator that consumes much less power is placed outside a reference oscillator. After a predetermined time the reference oscillator is started and regulation/correction or calibration of the frequency of the primary oscillator is performed using the frequency of the reference oscillator. The primary oscillator may have a relatively substantial drift in frequency over time, but as long as it is frequently corrected or calibrated, the primary oscillator frequency will be stabilized over time and provide accurate readings. The reference oscillator may receive power from a power source using a power switch. The power source can be an internal battery or an external power source. The oscillator device as per the invention operates at high power efficiency because of intelligent starting and stopping of the reference oscillator.

If an environmental or internal sensor registers any movements of, or ambient or internal temperature changes in a node between two preset calibration points, then the processor is programmed to perform an additional calibration. Based on a formula determined by survey parameters, the system can also run both reference and primary oscillators simultaneously, this to check frequency variations between normal check points.

If the system registers a frequency difference between the reference oscillator and the primary oscillator that is close to being unacceptable, and the same or larger variation is registered at the next calibration point, then both oscillators will be run in parallel until the recording accuracy is acceptable.

When the calibration check of the primary oscillator indicates that it is not necessary to run the calibration check as often, then the calibration check interval can be increased by the predetermined program. If the opposite happens and the time or frequency drift is larger than acceptably, the calibration interval can be made longer.

In one aspect of the invention, a wireless node will perform a frequency control to synchronize the frequency of the primary oscillator to the frequency of a reference oscillator. Said wireless node comprises a frequency error measuring means for measuring a frequency error between the primary oscillator and the reference oscillator. A calculating means associated with the frequency error measuring means for calculating a calibration factor is based on inputs from the reference oscillator and generates an analog control signal that is repeatedly sent to the primary oscillator.

In one aspect of the invention, the reference oscillator runs continuously during deployment and is stopped first after the node at the ocean bottom has become stationary and the temperature sensor indicates that the ambient and/or the internal temperature have stabilized. The node receives instructions using a wireless access point and can communicate with a central master clock.

In one aspect of the invention, the reference oscillator may runs continuously during the process of recovering the nodes from the ocean bottom. During this activity the primary oscillator may be influenced by the movements of the nodes and/or temperature changes.

In another aspect of the invention, the calculation and calibration of the frequency calibration value is programmed on board the control vessel, and computed based on water depth, the sound velocity in water, ocean bottom conditions and depends on expected possible delay in acquiring the seismic, or any other operational requirements.

The present invention will overcome many of the limitations that are inherent in existing systems, as the described use of a reference oscillator together with a primary oscillator enables more precise mapping and that the seismic nodes can stay longer underwater once they have been deployed. The new underwater seismic sensor node provides precise timing based upon an adaptive calibration method, where previous data will be used in the calculation.

The proposed new apparatus will be well suited for conducting OBS surveys at any water depth and the use of such an apparatus will significantly lower the costs compared to the existing systems for acquisition of seismic data.

BRIEF DESCRIPTION OF DRAWINGS

Example embodiments of the invention will now be described with reference to the followings drawings, where:

FIG. 10 illustrates a comparison among oscillators according to a paper by Carleton University, November 2008.

DETAILED DESCRIPTION

Figure 1:
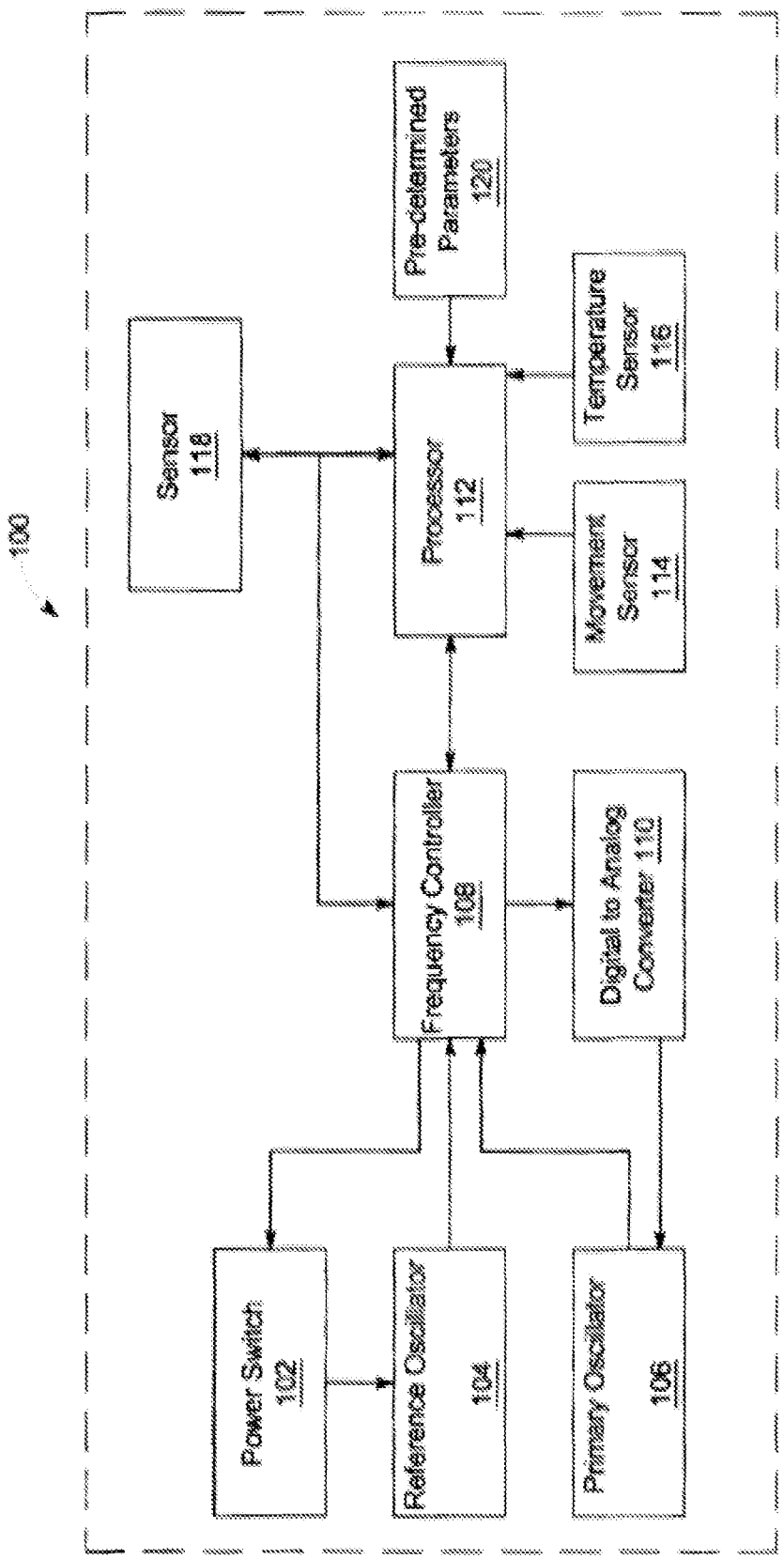
FIG. 1 illustrates a block diagram of a seismic node apparatus according to an embodiment of the invention.

Example embodiments will be described with reference to the drawings. The same reference numerals are used for the same or similar features in all the drawings and throughout the description.

FIG. 1 illustrates a block diagram of a seismic node apparatus. The description of FIG. 1 includes a general description of an autonomous seismic node 100 that include a primary oscillator 106 and a reference oscillator 104 and a computing environment for which the embodiments may be implemented.

Various embodiments may be practiced with a computer, a mainframe computer or combinations that include workstations with servers. Program modules include routines, programs, objects, components and data structures for performing tasks, processing data, and recording and displaying information.

Embodiments may be practiced with various system configurations that separately or in combination with the seismic node or an autonomous seismic node may include hand-held devices, multiprocessor systems, microprocessor-based or programmable consumer electronics, network computers, minicomputers, mainframe computers, and the like. Embodiments may be practiced with tasks performed in and over distributed computing environments that include remote processing devices linked through a communications network. Program modules, processors, operating in distributed computing environments may be located in various memory locations, both local/within and remote to the seismic node.

The seismic node 100 can have one or a plurality of sensors, such as geophones, hydrophones or accelerometers with associated electronic such as processors, hardware for filtering, digitalizing the recorded data, storing of data and power supplies. Here this is covered by the block marked as 118.

The seismic node 100 further includes a power switch 102 for switching on or off the reference oscillator when required. An energy source provides power to the seismic node 100. Further, the seismic node 100 includes a processor 112 coupled with an internal system memory that will include instructions. The system memory can be attached to a system bus that operatively couples various system components to the processor 112 or within themselves. The system bus can be any of several types of bus structures using any of a variety of bus architectures as are known generally. A separate dedicated analog to digital converter 110 is also associated with the computing environment for frequency calibration.

While a single processor 112 is illustrated in FIG. 1, there may be a single central-processing unit (CPU) and/or a digital signal processor (DSP) or both or a plurality of processing units. A FPGA, ASIC or a similar device could also act as processing unit. The autonomous seismic node 100 may be a standalone device, a distributed device, or may operate as a standalone computing/data acquisition device.

The system memory can be any type of physical memory, may include read only memory (ROM) with a basic input/output system (BIOS) containing the basic routines that help to transfer information between elements within an autonomous seismic node 100, for example during start-up. The system memory of the autonomous seismic node 100 further may include random access memory (RAM) that may include an operating system "OS", an application program and seismic data.

Various data input and output devices may be connected to the processor 112 through an internal/external interface.

The seismic node 100 may also include one or more sensors for monitoring components and environmental conditions. One type may be inertial sensor 114 that enable sensing of any movement or relative motion of the seismic node 100 at the ocean bottom in tilt, rotate, and roll type of relative motions. Further, another environmental sensor can be a temperature sensor 116 that sends temperature values of the ocean environment in the form of signals to the processor 112 located in seismic node 100.

While an individual TCXO used as a primary oscillator 106 have a variable time-drift, each time-drift for a primary oscillator 106 may or may not be fairly consistent potentially resulting in seriously inaccurate data readings being submitted to the seismic data files. This inconsistency serves as a basis for using a reference oscillator 104, which either at predetermined intervals and/or adaptively determines a frequency calibration value for calibrating the frequency of the primary oscillator 106. The reference oscillator may be of an atomic type or another high quality oscillator.

Some stand alone oscillators may consist of two oscillators that interact with each other in one embodiment.

The basic unit of time, the second, is defined as "the duration of 9,192,631,770 periods of transition within the cesium atom". Therefore, the definition of a clock can be a device that counts the number of cycles or periods of an oscillator from a starting time. Since we count the number of periods of an oscillator, we will introduce a time error if the primary frequency change/drift over time. Since a seismic node records samples of seismic data, a drift in the frequency may cause an error in the recording of and subsequent processing of the seismic data.

Oscillators available for seismic nodes will have a drift caused by its structure and/or environmental conditions.

And since the most accurate oscillators may use more power than the less accurate oscillators, this invention will both solve the problem with power consumption and at the same time the requirement for data accuracy.

The reference oscillator 104 generates a signal repeatedly after a fixed or an adaptively calculated time period based on a set of pre-determined parameters 120 and transmits the signal to a frequency controller 108 using a system bus. The primary oscillator 106 also transmits the frequency which it is currently generating to the frequency controller 108. The signals from the reference oscillator 104 and the processor 112 are compared with the frequency received from the primary oscillator 106 and a digital signal for correction/calibration is sent to the dedicated digital to analog converter 110. The converter 110 sends the analog control signal to the primary oscillator 106 for calibrating the frequency of the primary oscillator 106.

The frequency error and calibration values may be stored in a memory for each calibration point for a possible use in processing analysis.

The reference oscillator 104 can be an atomic clock; a Chip Scale Atomic Clock "AT". The AT will have the same output/frequency as from an OCXO or a TCXO. For example, an AT unit may function as the reference oscillator with a TCXO unit as a primary oscillator 106 in an seismic node 100 in order to provide high precision data readings from the ocean bottom with optimal power efficiency.

The present invention works with reduced power which lowers cost for batteries as well as cost for associated peripheral equipment such as for example equipment for recharging of batteries, storage and handling. The batteries in the seismic nodes 100 represent a major expense and the numbers of sensor nodes in a typical acquisition grid are increasing. The combination of a more accurate reference oscillator with a power efficient TCXO having less accuracy will thus provide for a system that consumes less battery power.

The present system may offer reduced effects from environmental effects.

Figure 2:
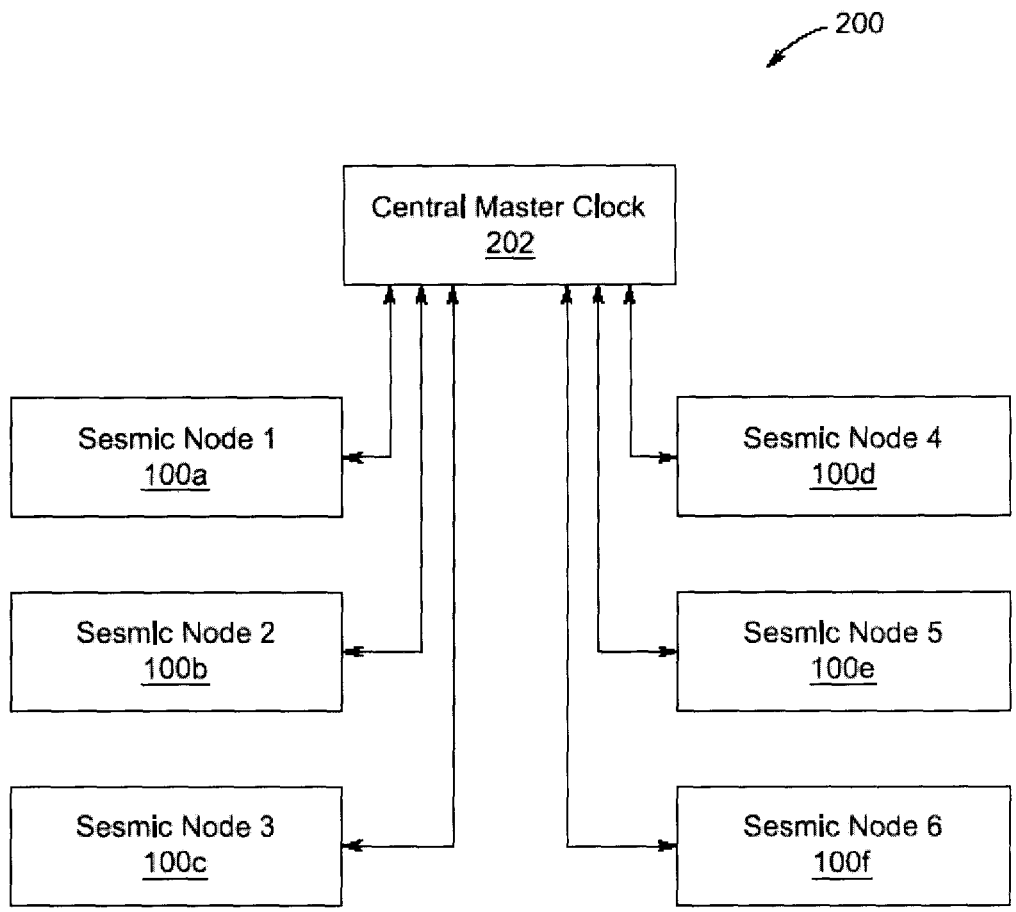
FIG. 2 illustrates a block diagram of a data acquisition system including multiple seismic nodes according to an embodiment of the invention.

FIG. 2 illustrates an exemplary embodiment of a data acquisition system 200. The data acquisition system 200 includes a plurality of seismic nodes 100, designated as 100a, 100b, 100c, 100d, 100e, 100f, etc. and a central master clock 202. Each seismic node 100 includes a primary oscillator 106, a reference oscillator 104 and sensors, which may be similar to the inertial sensor 114 and the temperature sensor 116 as illustrated in FIG. 1. Each seismic node 100 transmits a data stream of signals to the central computer with a master clock 202 via hard wires, wireless radio transmission, TCP Internet Protocol, or any other form of wired or wireless data transmission.

The seismic nodes 100 are autonomous, all of them are complete units with geophone, hydrophone, memory units, digitizing hardware, primary oscillator and a reference oscillator that is synchronized with the central master clock 202 onboard a ship or a source vessel that will later collect the data.

The central master clock 202 can have a central data receiver and a central processor which receives a data stream from a seismic node 100 and organizes the data streams according to their respective corresponding samples. By using the AT within the seismic node 100 data correction and/or calibration is improved in comparison with conventional seismic nodes not having an AT.

In the present invention, the AT as the reference oscillator 104 is used with the primary oscillator 106 in the seismic node 100. Using the AT at each of the seismic nodes 100 allows simple correlation of data among different seismic nodes 100 as well as with the central master clock 202.

Figure 3:
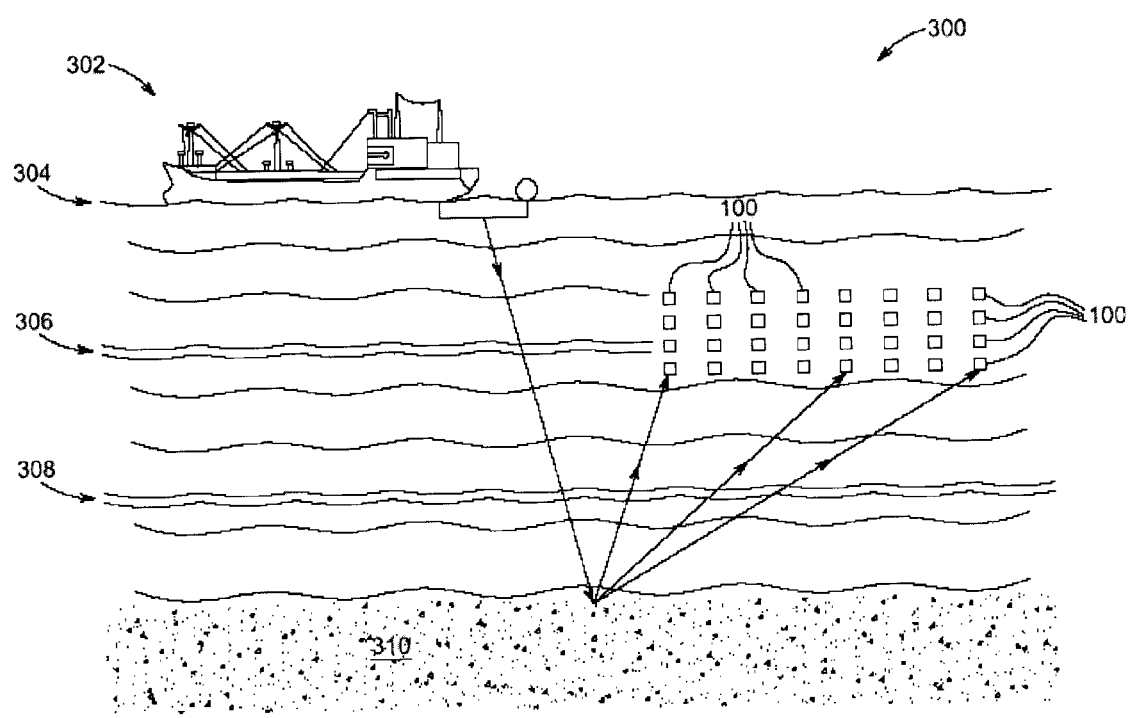
FIG. 3 illustrates data acquisition with multiple seismic nodes deployed at the ocean bottom and a vessel towing a seismic source for generating the seismic signals, according to an embodiment of the invention.

FIG. 3 illustrates how seismic nodes are deployed under water and how the seismic signals are generated from the vessel and received by the seismic nodes. In marine oil exploration applications, a grid of geophysical sensors or the seismic nodes 100 are placed on the ocean bottom 306 to help in determining the likely places where hydrocarbons can be located. The seismic nodes 100 can be dropped over the side of a vessel or laid down by a remotely operated vehicle. In one aspect of the invention, the seismic nodes 100 can either be independent deployed or deployed as autonomous nodes in an ocean bottom cable (OBS). Each of the seismic nodes 100 typically includes a hydrophone, one or more geophones, recording units and memory unit to store recorded data.

A standard seismic source vessel 302 can be used for generating a seismic signal by for example, a traditional air gun array. The source vessel 302 moves in a pattern that allows the energy source to be fired from multiple different positions relative to the grid of the seismic nodes 100. Some of the seismic energy reflects off the sea bed 306 and back to the sea level 304, the remaining seismic energy penetrates the sea bed 306, travels through geological layers 308, to for example potential reservoir rocks 310. Eventually the seismic energy reflects back to the seismic nodes 100 on the ocean bottom 306 where it is detected. After the vessel 302 has finished its predetermined survey operations, the seismic nodes 100 are retrieved. Because the seismic waves travel at different speeds in different materials, the time it takes to reflect back to the seismic nodes 100 through the various rock layers varies depending on which materials the seismic waves traverse. When the recorded data are processed, it creates a map of the layers of rock sediment layers beneath the ocean bottom 306, and may show locations likely to hold hydrocarbon deposits. The more precise the readings of the seismic nodes 100, the more accurately the map can predict the existence of hydrocarbon deposits.

The seismic nodes 100 may form a specialized array that rests on the ocean bottom and is used for data acquisition. Due to the complexity associated with establishing survey lines or laying the seismic nodes 100, different field equipment is used depending on the depth of water, temperature levels and other environmental and geological factors.

A variety of seismic sources are available for marine applications, including water guns, air guns, sparkers and boomers.

During data acquisition, environmental noise may be recorded. Since the present invention records seismic data in an autonomous mode, this noise may be recorded by a separate data acquisition system with real time data transfer to one of the vessels for quality control purposes. Several options for environmental noise recording are feasible. One option is to record the data with a short seismic streamer towed behind the source vessel 302. The streamer is typically equipped with hydrophones which sense the environmental noise. The data is transferred to the recording system on the vessel 302 through the streamer. Analysis of the data can then be performed on the vessel 302. The data is transferred through a lead-in cable to a recording buoy and then transferred by radio to one of the vessels for analysis. Alternatively, hydrophones can be mounted on the lead-in cable and the geophones left out.

Figure 4:
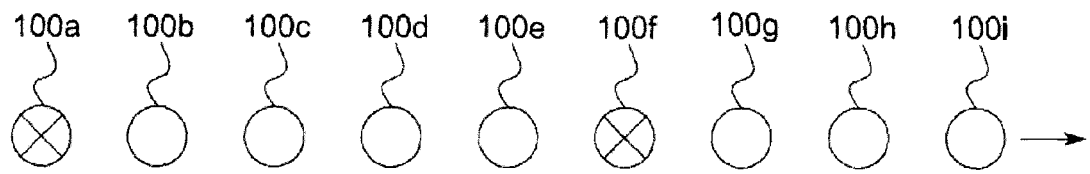
FIGS. 4, 5 and 6 illustrate a method of saving power by a programmed sequence to alternate between which nodes that at a certain time uses the reference oscillator.
Figure 5:
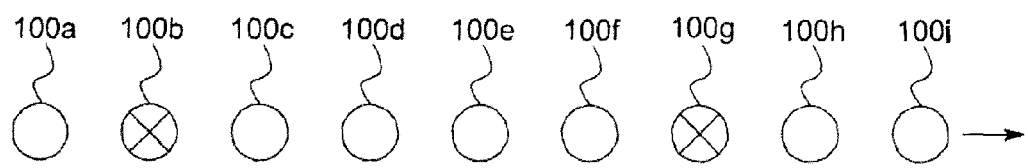
Figure 6:
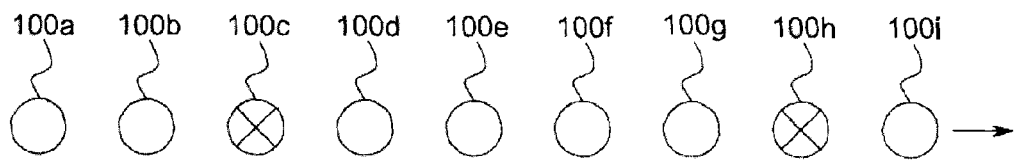

FIGS. 4, 5 and 6 illustrate another method that may be preprogrammed to alternate between the nodes in a sequence that will be run with the reference oscillator turned on (in FIG. 4 the nodes 100a and 100f), while the other nodes are controlled by the primary oscillators. The sample shows that every 5$^{th}$ node in a line is turned on.

During the next preprogrammed sequence (FIG. 5) the nodes controlled by the reference oscillator have been shifted to the next in line. Still every 5$^{th}$ oscillator is turned on, but now it is another set (marked 100b and 100g) of nodes that have the reference oscillators turned on.

FIG. 6 illustrates yet another sequence of reference nodes (100c and 100h) that are turned on. By this method it will be a further decrease in power consumption, while the accuracy will still be within the predefined limits. Since all nodes will shift in the sequence of having the highest power consumption, but also the most accurate frequency oscillator turned on, all nodes will over time have the same low power consumption. The nodes operating with the less accurate oscillators will be corrected for any drift during the next sequence when the reference oscillator is on.

Figure 7:
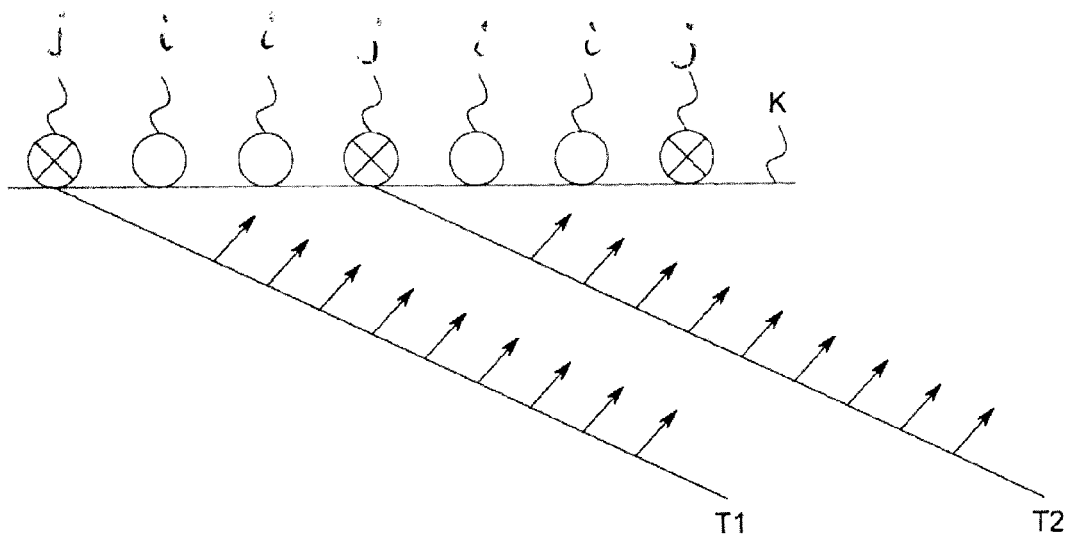
FIG. 7 Illustrates a method of data acquisition where one or more low power seismic nodes that only contain a primary oscillator are located in between seismic nodes that have both a primary oscillator and a reference oscillator.

FIG. 7 illustrates a method of data acquisition of an ocean bottom seismic survey where one or more low power seismic nodes (i) that only contain a primary oscillator are located on the seafloor (k) in between seismic nodes (j) that have both a primary oscillator and a reference oscillator. Improved timing of the seismic data recorded by the seismic nodes (i) may be achieved in post survey data processing, this by using the different arrival times of the direct or reflected seismic arrivals (T1 and T2) at the seismic nodes (j) for adjusting the seismic data recorded at intermediate nodes (i).

Figure 8A:
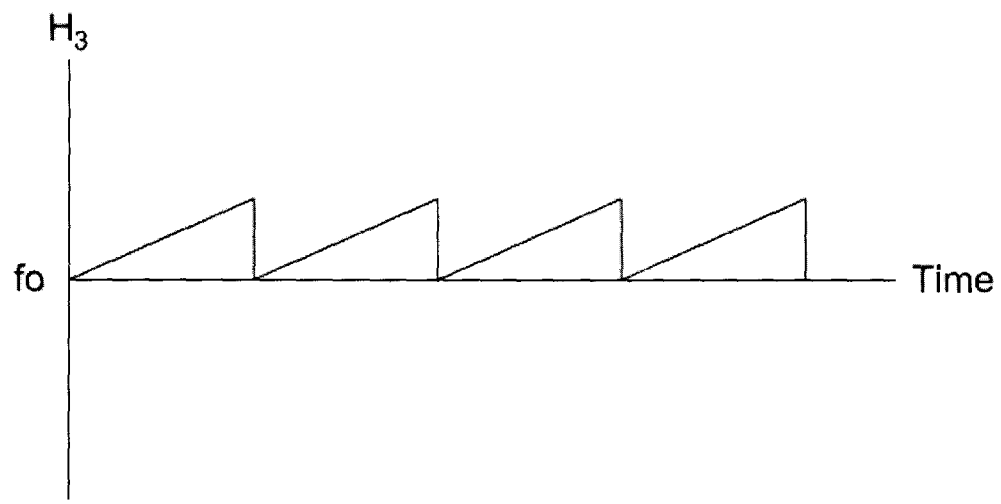
FIGS. 8a and b illustrate how a correction may be applied.

FIG. 8a shows a primary oscillator with drift as a function of time, and where a correction is applied down to the specified frequency fo.

Figure 8B:
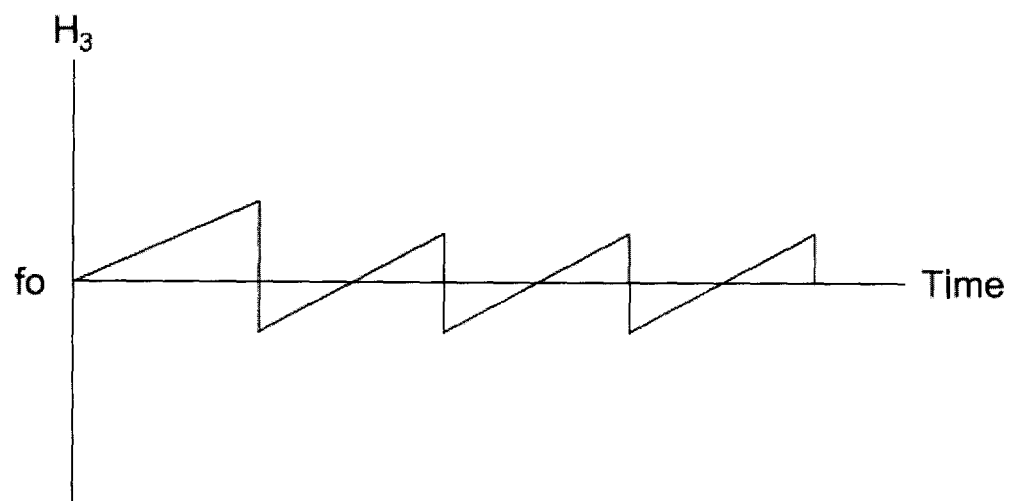

FIG. 8b shows a correction where drift is compensated for by making a frequency adjustment to below the specified frequency, this to achieve a reduced deviation from specified frequency fo.

Figure 9A:
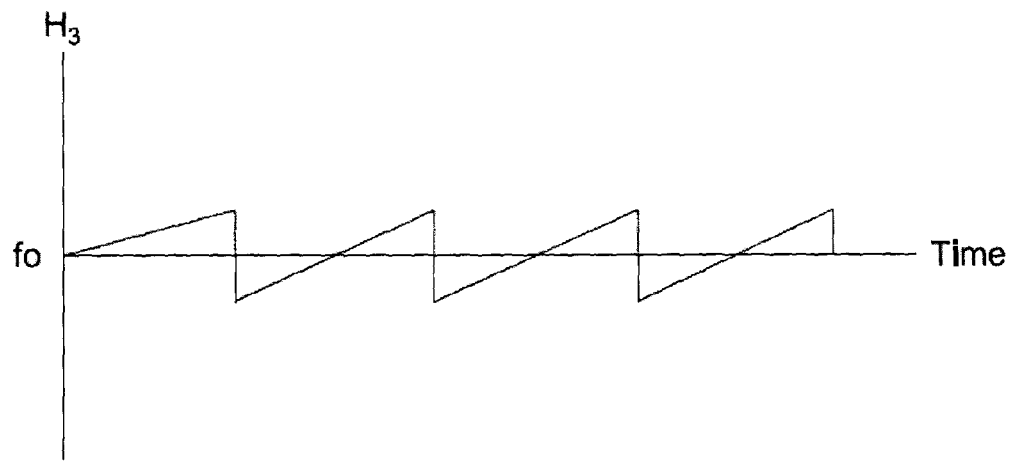
FIGS. 9a and b illustrate oscillator drifts.
Figure 9B:
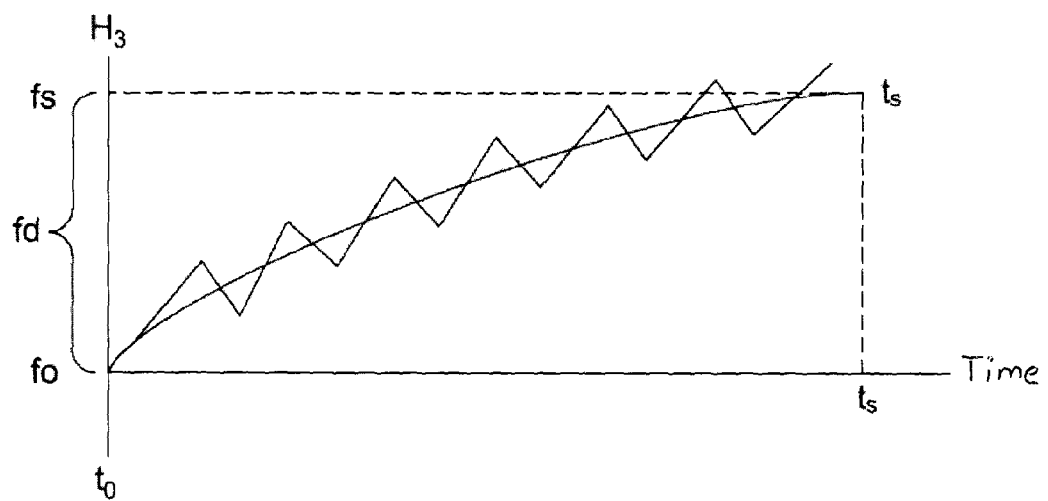

FIG. 9a shows a case where the frequency of the primary oscillator is corrected to vary around fo. Since the primary oscillator frequency is calibrated against a reference oscillator, and when this frequency is checked against the vessel's master clock at the end of the survey, it might be determined that the reference oscillator frequency also shows a drift equal to fd=fs−fo as illustrated in FIG. 9b. The data system onboard the vessel is equipped to make corrections to all recorded data as per a calculated frequency drift curve.

FIG. 10 shows comparison among oscillators.

Figure 11:
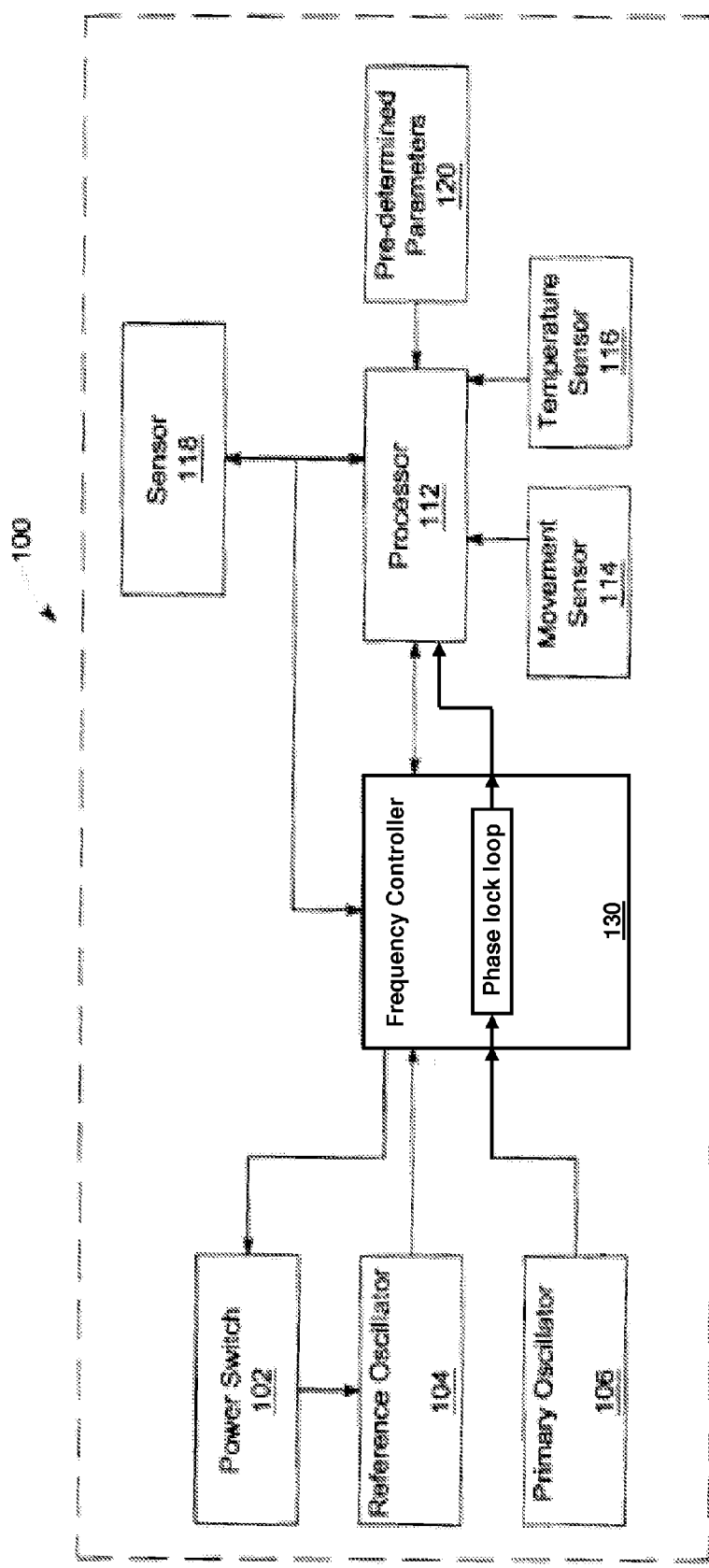
FIG. 11 illustrates an alternative block diagram of a seismic node apparatus according to an embodiment of the invention.

FIG. 11 illustrates an alternative to the block diagram in FIG. 1. In FIG. 11, a frequency controller 130 with a built-in phase lock loop replaces the frequency controller 108 and Digital to Analog Converter 110 shown on FIG. 1. The other components shown on FIG. 11 are explained in connection with FIG. 1.

In the embodiment of FIG. 11, the reference oscillator 104 generates a clock signal repeatedly after a fixed or an adaptively calculated time period based on a set of pre-determined parameters 120 and transmits the clock signal to a frequency controller 130. The primary oscillator 106 continuously transmits a clock signal to the frequency controller 130. The clock signals from the reference oscillator 104 and primary oscillator 106 are compared inside the frequency controller 130 and a correction is calculated and applied to the phase lock loop. The output from the phase lock loop is then fed to the processor 112.

The seismic data acquisition system disclosed herein is particularly suited for OBS surveys at any water depth and the use of the present invention can significantly lower the data acquisition cost when compared to prior art.

The present invention is of course not in any way restricted to the embodiments described above. On the contrary, many possibilities for modifications thereof will be apparent to a person with ordinary skill in the art without departing from the basic idea of the invention such as defined in the appended claims. Further it is foreseen that some of the basic novel principles may be the subject of independent protection (e.g. by divisional applications) not limited to the seismic field. For instance this relates to calibrating an oscillator to save power. The frequency of an oscillator as defined, without any restriction to any field of application, and/or the use of the basic calibration method for drift calibration, wherein start and stop signals are sent to the clock of the reference oscillator in longer cycles of predetermined time intervals for system time accuracy.

The invention claimed is:

1. An ocean bottom seismic node comprising:
   at least one seismic sensor with associated electronics;
   a primary oscillator configured to time sensor signals;
   a memory;
   a power source;
   a reference configured to receive power from the power source;
   a power switch between the power source and the reference oscillator; and
   a processor configured to control a frequency calibration of the primary oscillator using a frequency calibration value based on a frequency provided by the reference oscillator, and configured to turn the reference oscillator on and off using the power switch, wherein the memory is in communication with the processor and the ocean bottom seismic node is constructed for use at a bottom of an ocean, wherein the reference oscillator is switched off when the frequency calibration is performed.

2. The ocean bottom seismic node of claim 1, wherein the reference oscillator is placed outside the primary oscillator.

3. The ocean bottom seismic node of claim 1, wherein the processor calibrates the frequency of the primary oscillator after a time interval.

4. The ocean bottom seismic node of claim 1, wherein the frequency error of the primary oscillator and the calibration data is stored in the memory.

5. The ocean bottom seismic node of claim 1, wherein the processor turns the reference oscillator on or off according to a predetermined algorithm used to optimize power consumption in relation to total system accuracy requirement.

6. The ocean bottom seismic node of claim 1, further comprising at least one sensor for monitoring environmental conditions.

7. The ocean bottom seismic node of claim 1, further comprising at least one sensor for monitoring movement of the seismic node.

8. The ocean bottom seismic node of claim 1, further comprising a digital to analog converter configured to receive a digital signal and operable to generate an analog signal for application to the primary oscillator.

9. The ocean bottom seismic node of claim 1, wherein calibrating a frequency of the primary oscillator based on the frequency of the reference oscillator, and turning the reference oscillator on and off is performed by a frequency controller employing a phase locked loop.

10. The ocean bottom seismic node of claim 1, further comprising a wireless access point for external communication with the processor.

11. A method for calibrating an oscillation frequency of a primary oscillator of an ocean bottom seismic node, the method comprising:
turning on a reference oscillator using a switch, wherein the reference oscillator is connected to the switch and the switch is connected to a power source;
stabilizing the frequency of the primary oscillator of the ocean bottom seismic node located at a bottom of an ocean, based on the frequency of the reference oscillator, calculating a frequency calibration value for calibrating the frequency of the primary oscillator, wherein the primary oscillator configured to time sensor signals;
based on the frequency calibration value, adjusting the frequency of the primary oscillator;
turning off the reference oscillator using the switch after the calibration was performed; and
after a time interval, repeating the above steps.

12. The method of claim 11, wherein the reference oscillator is turned on and off by a signal external to the primary oscillator.

13. The method of claim 12, wherein the external signal is sent from a central control system.

14. The method of claim 11, wherein the time interval for start and stop signals to the reference oscillator is predetermined by an algorithm regarding the optimum power consumption in relation to total system time accuracy.

15. The method of claim 11, wherein the time interval is determined based on the expected degree of weather standby.

16. The method of claim 11, wherein the time interval is determined based on information related to the environment and/or the geology at the location of the seismic node.

17. The method of claim 11, wherein, if the seismic node is being deployed at an ocean bottom, the reference oscillator is turned on during deployment, and turned off after the seismic node has come to rest at the ocean bottom and the internal and/or external temperature has stabilized, as measured by sensors of the seismic node.

18. The method of claim 11, wherein, when the seismic node is being recovered from the ocean bottom, the reference oscillator can be turned on during the operation.

19. The method of claim 11, wherein, if a sensor of the seismic node senses a movement of the seismic node or an internal or external temperature change, a calibration of the oscillation frequency of the primary oscillator is carried out.

20. The method of claim 11, wherein, in all or part of the time interval between calibrations of the primary oscillator, the primary oscillator and the reference oscillator are run simultaneously, the frequency difference is registered, and, based on the frequency difference, a decision is made whether to continue to run the primary oscillator and the reference oscillator simultaneously, to maintain, reduce or increase the time interval between calibrations, or to carry out a calibration.

21. The method of claim 11, wherein the seismic node is part of an array of seismic nodes that rests on the ocean bottom and is used for data acquisition, each seismic node in the array is part of a set of seismic nodes, there are at least two sets of seismic nodes, wherein the reference oscillators for the seismic nodes of each set are sequentially turned on while the reference oscillators for the seismic nodes of the other sets are turned off.

* * * * *